United States Patent
Wang et al.

(10) Patent No.: US 12,181,852 B2
(45) Date of Patent: Dec. 31, 2024

(54) FLEXIBLE MAP WITH APPLICATION DATA IDENTIFIERS FOR PLC COMMUNICATIONS

(71) Applicant: Nordson Corporation, Westlake, OH (US)

(72) Inventors: Wei Wang, Duluth, GA (US); Michael J. Palmer, Duluth, GA (US); Daniel B. Thompson, Duluth, GA (US); Andreas Ehlers, Rullstorf (DE)

(73) Assignee: Nordson Corporation, Westlake, OH (US)

( * ) Notice: Subject to any disclaimer, the term of this patent is extended or adjusted under 35 U.S.C. 154(b) by 425 days.

(21) Appl. No.: 17/761,840

(22) PCT Filed: Sep. 18, 2020

(86) PCT No.: PCT/US2020/051404
§ 371 (c)(1),
(2) Date: Mar. 18, 2022

(87) PCT Pub. No.: WO2021/055685
PCT Pub. Date: Mar. 25, 2021

(65) Prior Publication Data
US 2022/0326675 A1    Oct. 13, 2022

Related U.S. Application Data

(60) Provisional application No. 62/903,465, filed on Sep. 20, 2019.

(51) Int. Cl.
*G05B 19/05* (2006.01)
*B05C 11/10* (2006.01)

(52) U.S. Cl.
CPC ........ *G05B 19/054* (2013.01); *B05C 11/1042* (2013.01); *G05B 19/056* (2013.01)

(58) Field of Classification Search
None
See application file for complete search history.

(56) References Cited

U.S. PATENT DOCUMENTS 5,604,914 A    2/1997 Kabe
5,978,593 A    11/1999 Sexton
(Continued)

FOREIGN PATENT DOCUMENTS

CN    1806936 A    7/2006
CN    101193307 A    6/2008
(Continued)

OTHER PUBLICATIONS

IPEA/409—International Preliminary Report on Patentability Mailed on Mar. 31, 2022 for WO Application No. PCT/US20/051404.
(Continued)

*Primary Examiner* — Scott C Sun
(74) *Attorney, Agent, or Firm* — BakerHostetler

(57) ABSTRACT

A flexible map with application data identifiers for PLC communications is described. An example method comprises receiving a first user input indicative of a selection of a parameter from a plurality of parameters associated with an adhesive dispensing system (614). The parameter is subject to data exchange between a controller (616) of the adhesive dispensing system (614) and an associated programmable logic controller (610). A second user input is received that is indicative of a memory space location in a memory space of the controller (616). A custom data map is generated that is indicative of an association between the selected parameter and the memory space location.

20 Claims, 12 Drawing Sheets

(56) References Cited

U.S. PATENT DOCUMENTS

| | | |
|---|---|---|
| 2004/0124255 A1 | 7/2004 | Heerdt |
| 2006/0175432 A1 | 8/2006 | Brock et al. |
| 2014/0117050 A1 | 5/2014 | Beal et al. |
| 2014/0321467 A1 | 10/2014 | Wang et al. |
| 2015/0263765 A1 | 9/2015 | Zhang |
| 2016/0309973 A1 | 10/2016 | Sheikh et al. |
| 2018/0109652 A1 | 4/2018 | Walls et al. |
| 2020/0277419 A1* | 9/2020 | Carvagno ............... C08F 10/06 |

FOREIGN PATENT DOCUMENTS

| | | |
|---|---|---|
| CN | 101683788 A | 3/2010 |
| CN | 102132265 A | 7/2011 |
| CN | 103061905 A | 4/2013 |
| CN | 103260007 A | 8/2013 |
| CN | 103699030 A | 4/2014 |
| CN | 104135437 A | 11/2014 |
| CN | 104917587 A | 9/2015 |
| CN | 105373349 A | 3/2016 |
| CN | 107479531 A | 12/2017 |
| CN | 107708511 A | 2/2018 |
| CN | 108647241 A | 10/2018 |
| CN | 109167768 A | 1/2019 |
| CN | 109873769 A | 6/2019 |
| EP | 0522590 A1 | 1/1993 |
| EP | 0772106 A1 | 5/1997 |
| JP | 2012-081376 A | 4/2012 |
| JP | 2012-132769 A | 7/2012 |
| JP | 2014-083540 A | 5/2014 |

OTHER PUBLICATIONS

ISA/220—Notification of Transmittal or Search Report and Written Opinion of the ISA, or the Declaration Mailed on Nov. 24, 2020 for WO Application No. PCT/US20/051404.

* cited by examiner

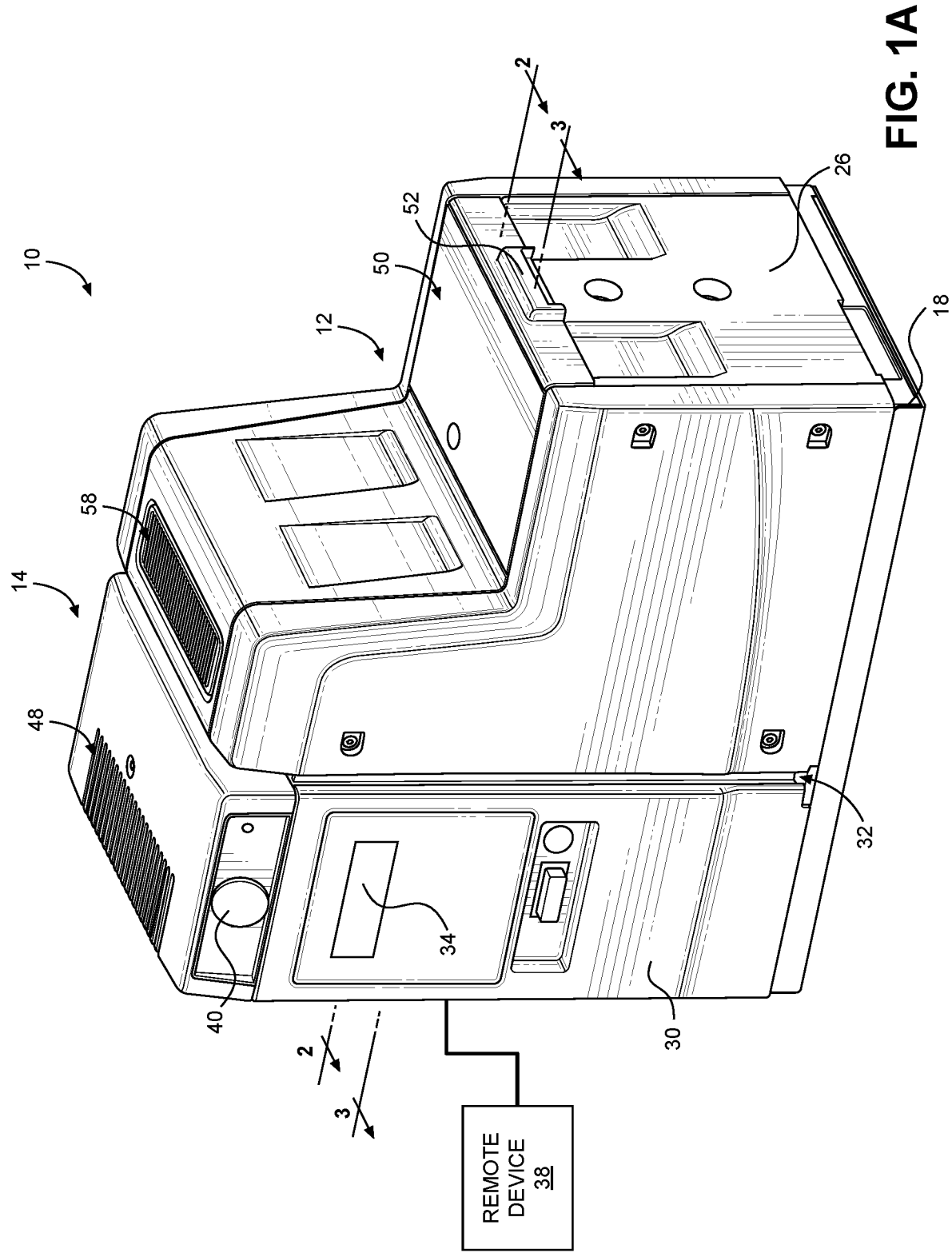

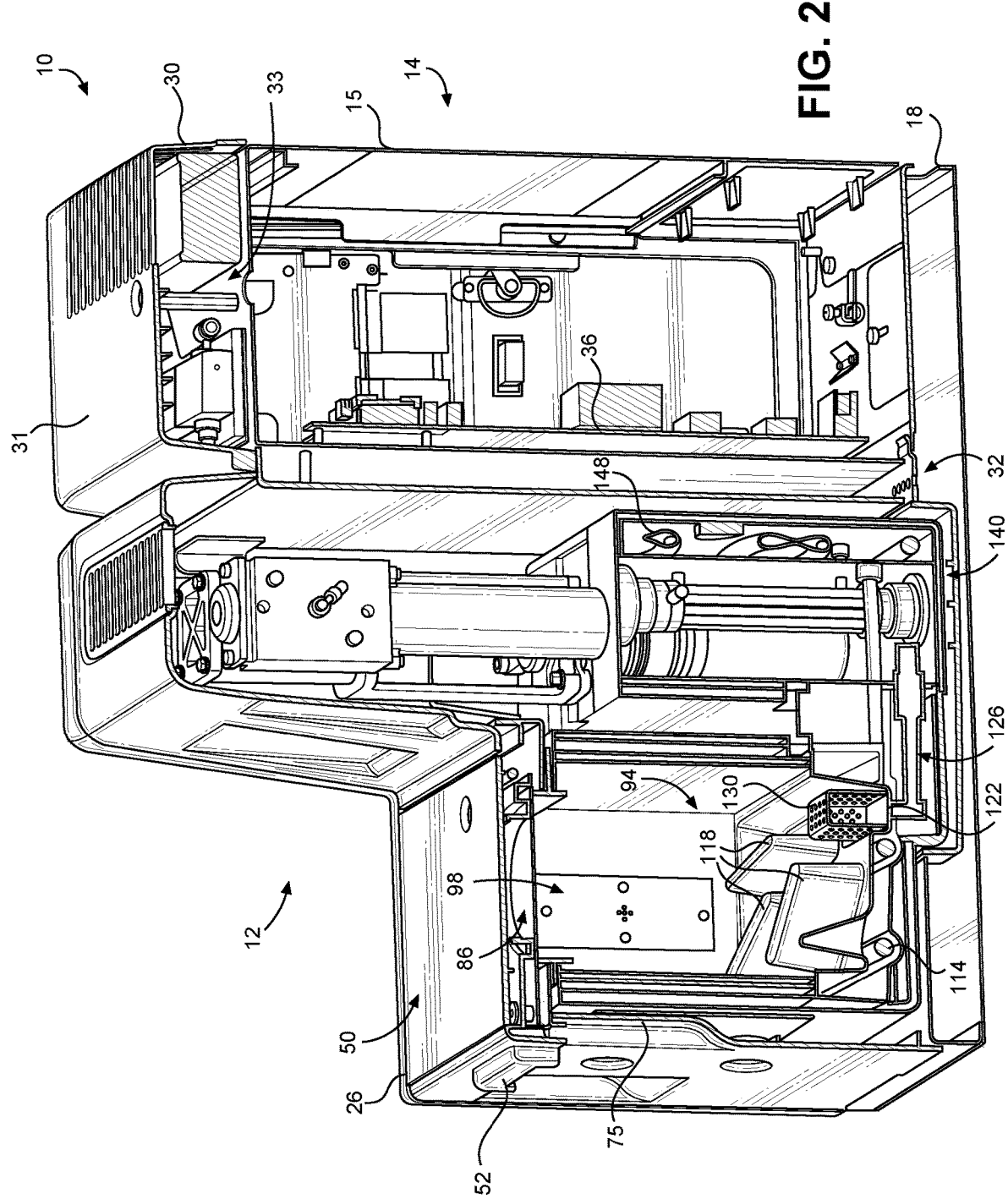

FLEXIBLE MAP WITH APPLICATION DATA IDENTIFIERS FOR PLC COMMUNICATIONS

CROSS-REFERENCE TO RELATED APPLICATIONS

This application is a National Stage of International Patent Application No. PT/US2020/051504, filed Sep. 20, 2020 which claims priority to U.S. Provisional Application No. 62/903,465 filed Sep. 20, 2019, the disclosures of which are incorporated herein by reference in their entireties.

TECHNICAL FIELD

The present disclosure generally relates to adhesive dispensing devices.

BACKGROUND

In adhesive melting and dispensing operations, many different types of adhesive dispensing devices can be utilized. Each type of adhesive dispensing device can have individualized characteristics that enhance its usefulness in certain melting and dispensing operations. However, this can be costly to a device operator, as conventionally a wholly new device may be required when a new melting and/or dispensing operation is to be performed. Alternatively, certain devices may be capable of being modified to accommodate new operations, though additional materials and components may be required in order to make this possible, thus further increasing operational costs for the operator. Additionally, each type of adhesive dispensing device may have a different shape and/or size, which can lead to difficulties for an operator when organizing an adhesive processing area.

Therefore, there is a need for an adhesive dispensing device that can be easily reconfigured by an operator to perform a variety of melting and/or dispensing operations.

SUMMARY

The foregoing needs are met by various aspects of dispensing devices disclosed. According to an aspect of the disclosure, a method comprises receiving a first user input indicative of a selection of a parameter from a plurality of parameters associated with an adhesive dispensing system. The parameter is subject to data exchange between a controller of the adhesive dispensing system and an associated programmable logic controller (PLC). A second user input is received that is indicative of a memory space location in a memory space of the controller. A custom data map is generated that is indicative of an association between the selected parameter and the memory space location.

According to another aspect, a controller associated with an adhesive dispensing system comprises one or more processors and memory storing instructions that, when executed by the one or more processors, cause the controller to receive input of a configuration file comprising a custom data map. The custom data map indicates a plurality of parameters associated with the adhesive dispensing system and a plurality of corresponding memory space locations of a memory space available to the controller. The instructions further cause the controller to determine a parameter value of a parameter of the plurality of parameters. The instructions further cause the controller to cause the memory space to indicate the parameter value at the memory space location corresponding to the parameter.

According to another aspect, a device comprises one or more processors and memory storing instructions that, when executed by the one or more processors, cause the controller to receive a first user input indicative of a selection of a parameter from a plurality of parameters associated with an adhesive dispensing system. The parameter is subject to data exchange between a controller of the adhesive dispensing system and an associated programmable logic controller (PLC). The instructions further cause the device to receive a second user input indicative of a memory space location in the memory space of the controller. The instructions further cause the device to generate a custom data map indicative of an association between the selected parameter and the memory space location.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

FIG. 1A illustrates a perspective view of an adhesive dispensing device according to an embodiment of the present disclosure;

FIG. 2 illustrates a cross-sectional view of the adhesive dispensing device shown in FIG. 1A, taken along line 2-2 shown in FIG. 1A;

DETAILED DESCRIPTION OF ILLUSTRATIVE EMBODIMENTS

Figure 1B:
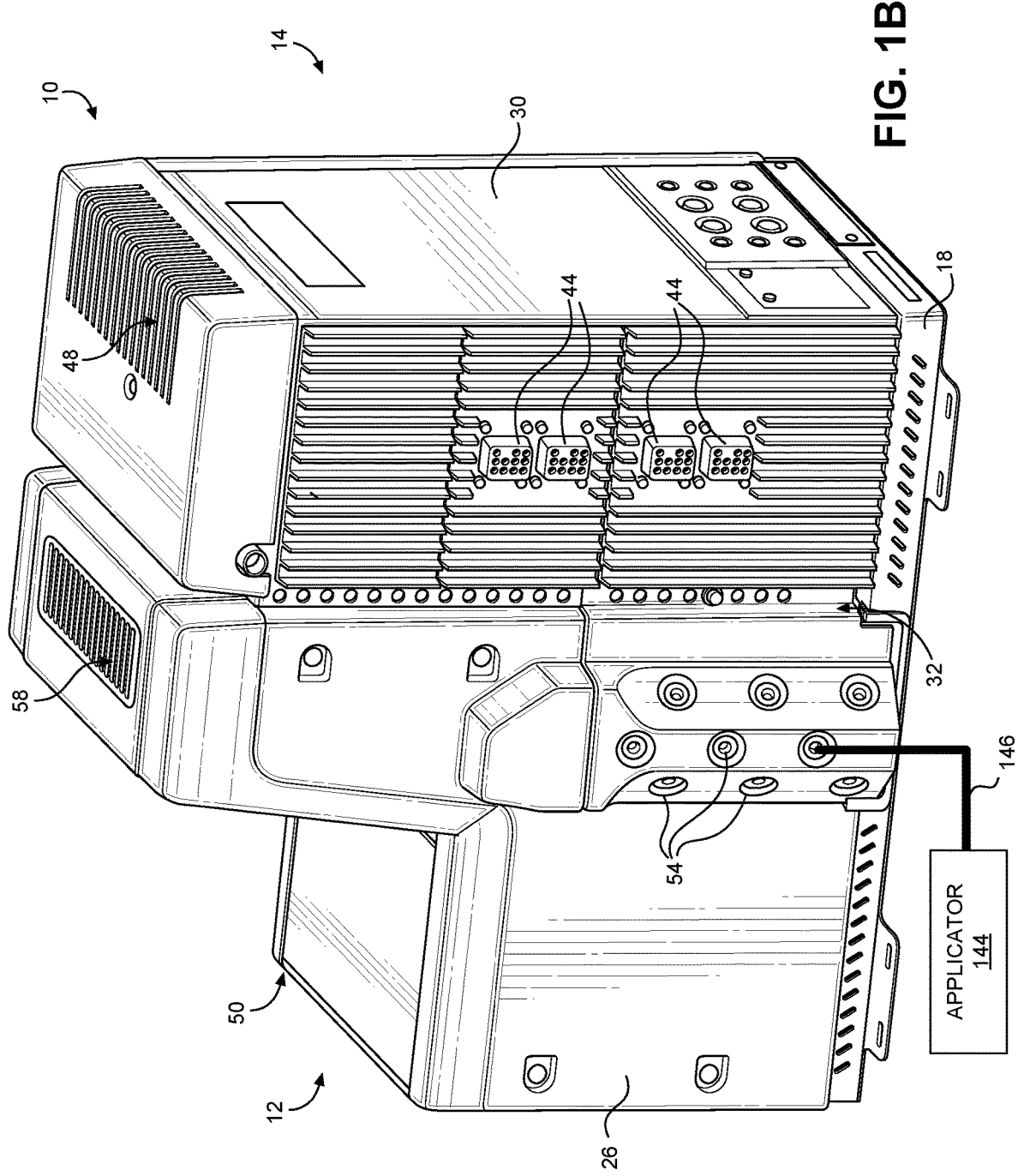
FIG. 1B illustrates an alternative perspective view of the adhesive dispensing device shown in FIG. 1A.

Referring to FIGS. 1A-3, a modular adhesive dispensing device 10 in accordance with one embodiment of the invention is shown. The adhesive dispensing device 10 includes a melt module 12 and a control module 14 electrically and/or physically coupled to the melt module 12. The melt module 12 is configured to include the components related to receiving solid adhesive and melting the solid adhesive, whereas the control module 14 is configured to include the electronic components for controlling operation of the melt module 12, where each of the melt module 12 and the control module 14 will be described in detail further below. Each of the melt module 12 and the control module 14 can be mounted to and supported by a base 18. The base 18 can comprise a metal body and is configured to releasably couple to each of the melt module 12 and the control module 14, such as through fasteners that can comprise bolts, screws, etc., though it is contemplated that the melt module 12 and the control module 14 can be alternatively coupled to the base 18 in other embodiments. The adhesive dispensing device 10 is modular in nature, and as such either or both of the melt module 12 and control module 14 can be detached from the adhesive dispensing device 10 and replaced with alternatively configured melt modules and control modules, as will be described further below.

When the melt module 12 and the control module 14 are coupled to the base 18, a thermal gap 32 can be defined between the melt module 12 and the control module 14. The thermal gap 32 can be configured to minimize and/or substantially eliminate heat transfer from the melt module 12 to the control module 14 so as to prevent damage to the electronic components contained by the control module 14 caused by the heat created by the melt module 12. The thermal gap 32 can comprise a space between the melt module 12 and the control module 14. Additionally, it is contemplated that the thermal gap 32 can further include materials configured to prevent heat transfer, such as various types of insulation, though any specific type of material or structure is not required.

Figure 1C:
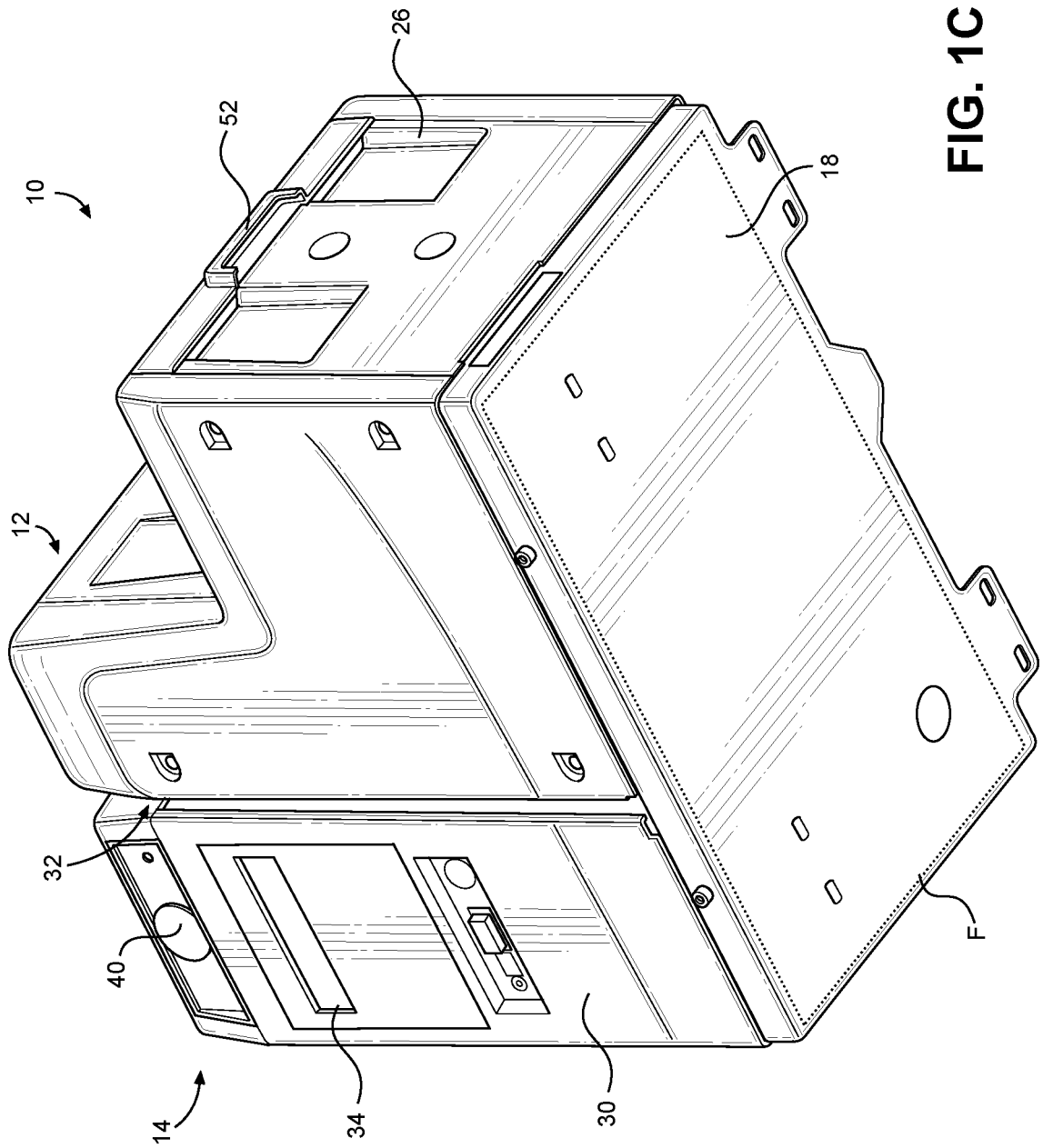
FIG. 1C illustrates another alternative perspective view of the adhesive dispensing device shown in FIG. 1A.
Figure 3:
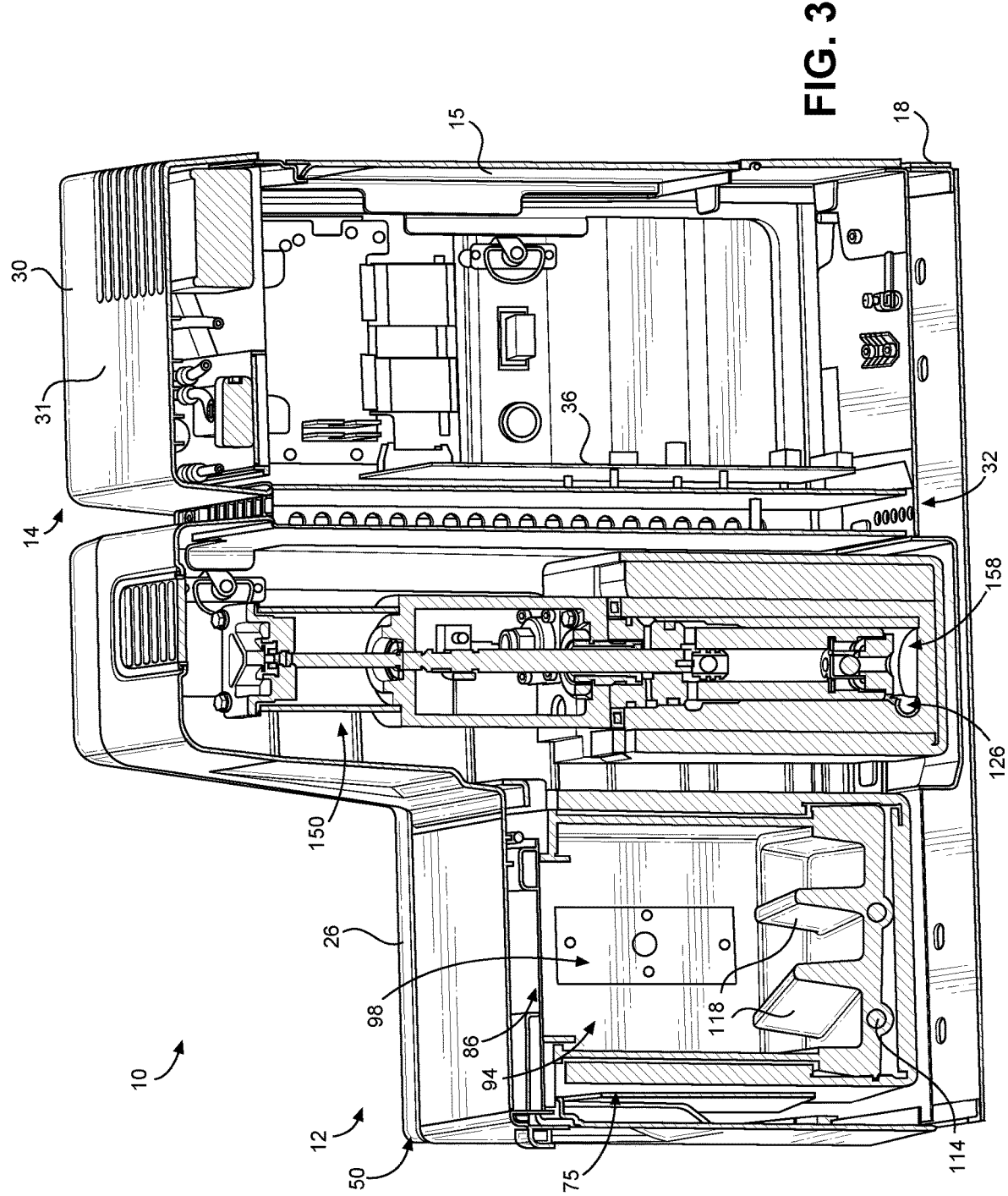
FIG. 3 illustrates an alternative cross-sectional view of the adhesive dispensing device shown in FIG. 1A, taken along line 3-3 shown in FIG. 1A.

As shown in FIG. 1C, the adhesive dispensing device 10 can define a specific footprint F. The lower end of the base 18 can define the footprint F, which can be defined as a cross-sectional shape and area defined by the lower end of the base 18. The footprint F can also, additionally or alternatively, be defined by the collective lower ends of the melt module 12 and the control module 14. As will be described further below, the adhesive dispensing device 10 is modular, such that either or both of the melt module 12 and control module 14 can be detached from the adhesive dispensing device 10 and replaced without affecting the size and or shape of the footprint F of the adhesive dispensing device 10. This can be highly beneficial to an operator of the adhesive dispensing device 10, as the adhesive dispensing device 10 can remain in place while the adhesive dispensing device 10 is reconfigured to replace certain components, potentially in preparation for a new adhesive melting and dispensing operation. Additionally, when setting up an adhesive processing area, the operator only needs to accommodate one shape and size of adhesive dispensing device.

Continuing with FIGS. 1A-3, the adhesive dispensing device 10 can include a melt module cover 26 and a control module cover 30 configured to provide selective access to the melt module 12 and the control module 14, respectively. The melt module cover 26 is configured to house the components of the melt module 12 and at least partially insulate the melt module 12 from the surrounding environment, while the control module cover 30 is configured to house the components of the control module 14, as well as insulate the control module 14 from the melt module 12 and the surrounding environment. The previously-described thermal gap 32 can be specifically defined between the melt module cover 26 and the control module cover 30. The melt module cover 26 can define a vent 58 that can be used to avoid overheating the components of the melt module 12 held within the melt module cover 26. Similarly, the control module cover 30 can define a vent 48 that can be used to avoid overheating the components of the control module 14 held within the control module cover 30. Though one embodiment and arrangement of vents 48, 58 is shown, the adhesive dispensing device 10 can include other embodiments of the vents 48, 58, as well as more vents not depicted or described herein.

The melt module cover 26 substantially encloses a melter subassembly 75 configured to receive and melt solid adhesive. A lid assembly 50 can be attached to the upper end of the melter subassembly 75. The lid assembly 50 can be configured to allow selective access to the interior of the melter subassembly 75, as well as protect the operator from the heat and associated fumes produced by the melter subassembly 75. The lid assembly 50 can include a handle 52 so as to be manually opened by the operator, though it is contemplated that the melt module 12 can include a mechanism for automatically opening the lid assembly 50. In the depicted embodiment, the lid assembly 50 allows the operator to manually open the lid assembly 50 so as to manually load the melt module 12 with solid adhesive as desired. However, it is contemplated that in other embodiments, the lid assembly 50 (or other components of the melt module 12) can include a passage for automatically loading the melt module 12 with solid adhesive from a solid adhesive source spaced from the adhesive dispensing device 10. As shown in FIG. 1B, the melt module 12 can also include a plurality of outputs 54 that are each configured to be in fluid communication with an applicator 144 (e.g., an application device), via a hose 146 (e.g., a heated hose), so as to convey melted adhesive from the melt module 12 to one or more applicators. As shown, when not connected to an applicator, each of the plurality of outputs 54 can be sealed using a plug. Any number or combination of the outputs 54 can be connected to an applicator at any instant according to the particular melting and dispensing operation being performed.

The control module 14 can include a controller 36. The controller 36 can comprise any suitable computing device configured to host a software application for monitoring and controlling various operations of the adhesive dispensing device 10 as described herein. It will be understood that the controller 36 can include any appropriate integrated circuit. Specifically, the controller 36 can include a memory and be in signal communication with a human-machine interface (HMI) device 34. The memory can be volatile (such as some types of RAM), non-volatile (such as ROM, flash memory, etc.), or a combination thereof. The controller 36 can include additional storage (e.g., removable storage and/or non-removable storage) including, but not limited to, tape, flash memory, smart cards, CD-ROM, digital versatile disks (DVD) or other optical storage, magnetic tape, magnetic disk storage or other magnetic storage devices, universal serial bus (USB) compatible memory, or any other medium which can be used to store information and which can be accessed by the controller 36. The memory of the controller 36 can be configured to store and recall on demand various metering operations to be performed by the adhesive dispensing device 10. The control module 14 can further include electrical connections 44 extending through the control module cover 30, which can be configured to connect with a power source, external computing devices, etc., so as to transmit power and/or signals to and from the adhesive dispensing device 10.

The controller 36 may be, or may include, a programmable logic controller (PLC) configured to execute specific pre-programmed operations in response to discrete input/output instructions. It will be understood that a plurality of PLCs may be present in a dispensing device 10 and may be configured to interact with the same or with different components or with other dispensing devices or associated systems. PLCs can advantageously be designed for various arrangements of digital and analog inputs/outputs, extended temperature ranges, immunity to electrical noise, and resistance to vibration and impact, dust, moisture, heat, cold, and other severe conditions that are often present in the manufacturing space. PLCs are associated with an operating program with pre-programmed instructions for the PLC that depend on the specific inputs or outputs. The operating programs may be stored in the controller 36, for example, in the removable or non-removable storage or memory.

In some aspects, the PLC of the controller 36 is configured to recognize and identify one or more components connected to the control module 14. Each component configured to connect to the dispensing device 10 may be given a unique address for the PLC to read and recognize. Each unique address is associated with relevant information related to the specific component. This information can be pre-defined in the operating program, for example, in a data map that includes instructions for executing commands in response to the discrete input/output identifiers of the specific components.

In some aspects, when one or more components are connected to the control module 14, the controller 36 is configured to recognize the connection, identify the connected component, retrieve the associated operating programming for the identified component, and execute the retrieved programming. For example, when the melt module 12 is connected to the control module 14, the controller 36 can recognize the connected melt module 12, identify the specific type of melt module 12 that was connected, and retrieve the programming commands associated with the specific melt module 12 that was identified. The programming can then allow for the manufacturing process to begin, or continue, based on characteristics of the specifically-identified melt module 12 that was connected. It will be appreciated that other components that can be engaged with the dispensing device may also be assigned unique identifies and may similarly be recognized by either the same or a different PLC as described.

Utilizing a PLC for removable components allows for easier and faster interchangeability of parts and reduces the necessary planning and execution steps that are associated with existing technology, such as manually identifying the connected components, manually instructing the controller of the identified components, and/or manually writing or selecting operating instructions to be used with the connected component. Such arrangements decrease network congestion and time spent on programming while allowing faster access to the ever-growing product data associated with components and devices used in this industry.

As noted above, the control module 14 can include an HMI device 34 in signal communication with the controller 36. In the depicted embodiment, the HMI device 34 can include a display, such as an OLED screen. However, it is contemplated that the HMI device 34 can also include, in addition or alternatively, various types of inputs that provide the ability to control the controller 36, via, for example, buttons, soft keys, a mouse, voice actuated controls, a touch screen, movement of the controller 36, visual cues (e.g., moving a hand in front of a camera on the controller 36), or the like. The HMI device 34 can provide outputs via a graphical user interface, including visual information, such as the visual indication of the current conditions within the adhesive dispensing device 10, as well as acceptable ranges for these parameters via a display. Other outputs can include audio information (e.g., via speaker), mechanically (e.g., via a vibrating mechanism), or a combination thereof. In various configurations, the HMI device 34 can include a display, a touch screen, a keyboard, a mouse, a motion detector, a speaker, a microphone, a camera, or any combination thereof. The HMI device 34 can further include any suitable device for inputting biometric information, such as, for example, fingerprint information, retinal information, voice information, and/or facial characteristic information, for instance, so as to require specific biometric information for accessing the controller 36. In addition to the HMI device 34, the control module 14 can include a pressure dial 40 for easily displaying pressure readings of the adhesive at certain locations within the adhesive dispensing device 10.

Additionally, the controller 36 can be in signal communication with a remote device 38 spaced from the control module 14. In one embodiment, the remote device 38 can comprise a display spaced from the control module 14, such as an OLED display, though various types of conventional displays are contemplated. Alternatively, the remote device 38 can comprise an external computing device, examples of which include a processor, a desktop computing device, a server computing device, or a portable computing device, such as a laptop, tablet, or smart phone. Accordingly, the remote device 38 can provide the operator with the ability to interact with and control the controller 36 at a distance from the adhesive dispensing device 10.

As stated above, the adhesive dispensing device 10 is modular in nature. As a result, the melt module 12 and control module 14 can be detached from the adhesive dispensing device 10 from which they are attached and replaced with a different one of the above described components and/or melt modules and control modules not described herein. When a melt module 12 or control module 14 is replaced, the particular control module 14 that is part of the adhesive dispensing device 10 at issue is configured to automatically recognize a characteristic associated with the melt module 12 currently attached to the control module 14. Subsequently, the control module 14 is configured to operate the melt module 12 using instructions stored on the controller 36 that correspond to the characteristic of the particular melt module 12. By providing the ability to recognize the type of melt module 12 and automatically begin operation of the melt module 12 using operations tailored specifically to that type of melt module 12, the adhesive dispensing device 10 described herein simplify customization and subsequent setup for an operator of the adhesive dispensing device 10, as well as reduce startup costs and operational errors related to a newly customized device.

One characteristic of a particular melt module 12 that can be recognized by the control module 14 and affect operation of the melt module 12 is the volume of the respective receiving space 94. For example, the receiving space of an adhesive dispensing device according to one aspect may be larger or smaller than the receiving space of an adhesive dispensing device according to another aspect. Receiving spaces of different sizes may be advantageous in different adhesive operations, largely due to differing adhesive storage needs, and the ability to easily transition between melt modules having differently sized receiving spaces provides an operator with a great amount of operational flexibility. According to some exemplary aspects, receiving spaces may be configured to receive and hold up to 4 kg of adhesive material, up to 7 kg, up to 10 kg, up to 14 kg, up to 15 kg, up to 21 kg, or up to another suitable quantity. In some aspects, the device may be tankless and be configured to receive adhesive to melt "on demand" as needed from a connected source (i.e. melt-on-demand). The melt-on-demand setup can be configured to process a desired quantity of material over a given time period, for example, approximately 7 kg per hour, 14 kg per hour, 21 kg per hour, or another suitable amount per hour. It will be appreciated that the specific capacity of the dispensing device would depend on manufacturing constraints and production preferences, such as how much material is needed, how long operation of the dispensing device is anticipated, what type of adhesive material is used, available manpower, or other characteristics that may affect manufacturing processes.

Another characteristic of a particular melt module 12 that can be recognized by the control module 14 and affect operation of the melt module 12 is whether the melt module 12 has a manual fill mechanism or an automatic fill mechanism. As described above, the adhesive dispensing device 10 can be manually filled with adhesive by opening the lid assembly 50 (i.e. manual fill mechanism). In contrast, an adhesive dispensing device can alternatively be automatically filled with adhesive through an input passage connected thereto (not shown) (i.e. automatic fill mechanism). Manual and automatic fill mechanisms can each be desirable in different operations, and the ability to easily change between either helps streamline changes to adhesive processing operations. In additional to receiving space volume and fill characteristics, the control module 14 can be configured to automatically recognize additional characteristics of the melt module 12, such as heater type, pump type, output configuration, or other relevant characteristics.

In addition to automatically recognizing characteristics of the melt module 12, the control module 14 can be configured to display the characteristic for review and verification by the operator. This prevents an adhesive dispensing system from being incorrectly set up and allows various personnel to be continuously apprised of the configuration of any adhesive dispensing device at issue. In some aspects, the HMI device 34 may include a display configured to produce an output indicative of the characteristic of the melt module 12. In other aspects, this output can be produced by the remote device 38.

As noted above, the controller 36 may be configured to recognize, using one or more PLCs, the components connected to the dispensing device 10. In some specific aspects, the connectable component is the melt module 12. As explained above, various melt modules 12 can be utilized with the dispensing device 10. Each type of melt module 12 may be removably connected to the control module 14. It will be appreciated that various melt modules 12 may be used, for example different capacities, and that the provided examples do no limit the capabilities of the dispensing device 10 to interact with other types of melt modules.

Figure 4:
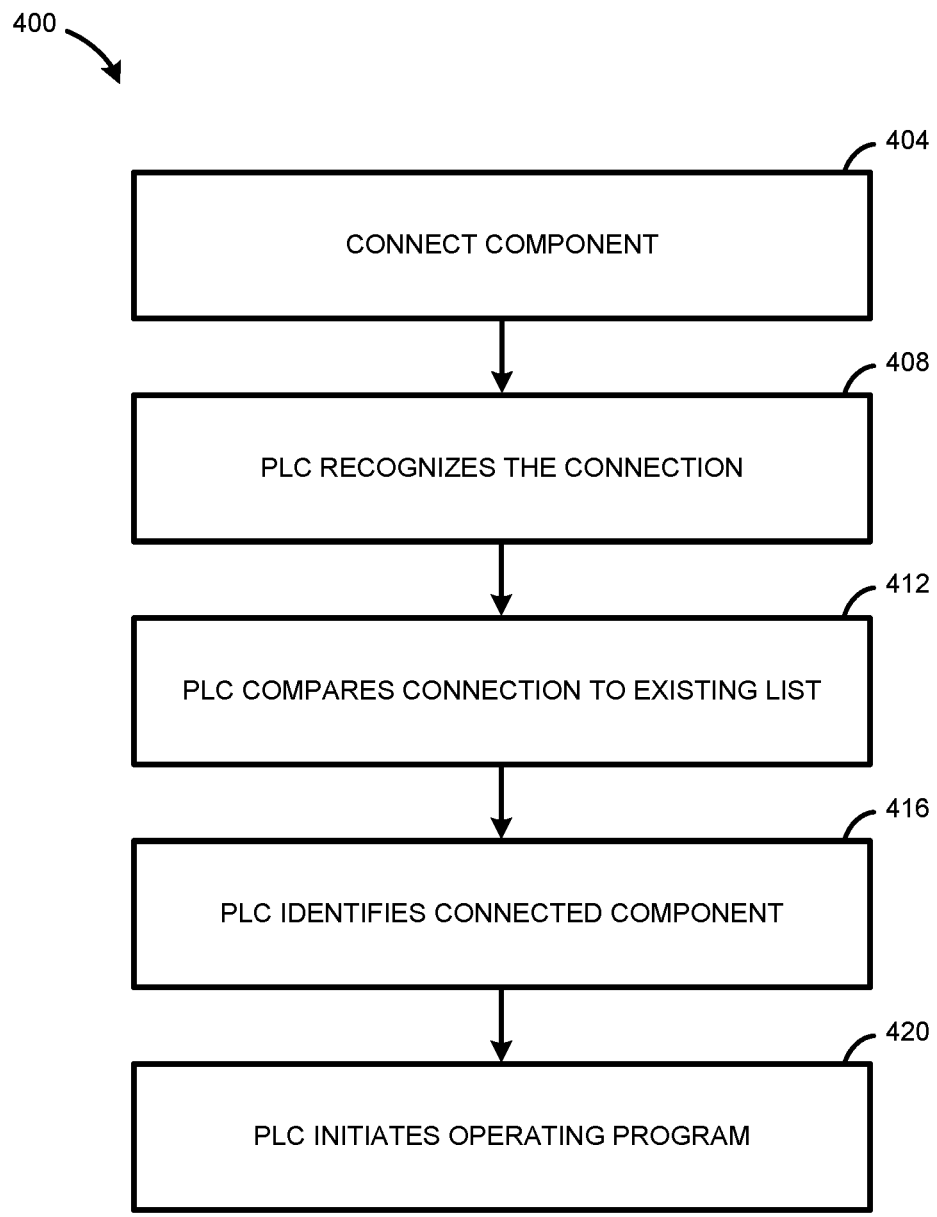
FIG. 4 illustrates a process flow diagram of a process of connecting, identifying, and operating a melt module according to an aspect of the present disclosure.

Referring to FIG. 4, a method 400 is disclosed that describes the process of connecting, identifying, and operating a melt module 12 according to an aspect of the present disclosure. In step 404, a melt module 12 is connected to the dispensing device 10, for example, to the control module 14. The connection may include physical engagements, such as grooves, latches, fasteners, or friction fit, as well as electrical connections, such as electrical or magnetic communication via, for example, conductive contacts on the melt module 12 and corresponding conductive contacts on the control module 14. When the electrical connection has been established in step 404, then in step 408 the PLC of the controller 36 recognizes that a component has been connected to the control module 14. In step 412, the PLC interprets the established connection from step 408 and recognizes the unique input address associated with the connected the component. The PLC compares this unique address to a list of existing or pre-programmed addresses, each of which is associated with a discrete component. In some aspects, if no match is found, this may be indicative of a faulty component, an improperly pre-programmed PLC, or that the component that was connected (e.g. the melt module 12) is not intended to be used with this particular dispensing device 10.

If a matching unique input address is found, then, in step 416, the PLC identifies the matching address and the specific component associated with it. At this point, the PLC has identified specifically which component (e.g. which melt module 12) has been connected to the control module 14. Each specific component has an operating program that is associated with it. The operating program may include commands for initiating, terminating, pausing, or otherwise modifying operation of the component and is created in view of the characteristics and capabilities of the specific component. Operating programs may be the same or similar between various components, or each program may be completely unique. It will be appreciated that the operating program for each component will depend on manufacturing constraints and requirements, the intended use, and the characteristics of each component.

In step 420, after identifying the specific connected component and its associated operating program, the PLC initiates the operating program related to the specific component (e.g. an operating program related to the specific melt module 12 that has been connected).

The method 400 may include various additional steps, such as first disconnecting and removing an existing component before step 404. Furthermore, the PLC may be configured to initiate multiple operating programs for each component. In some aspects, the PLC may also communicate with the rest of the controller 36 and the control module 14 and transmit or receive commands based on one or more operating programs associated with operation of the dispensing device 10 as a whole while simultaneously performing the steps of the method 400.

PLC operation as described in the method 400 allows for easier and faster interchangeability of components in the dispensing device 10. It also do not require changing the electronic components of the system, such as the control module 14 or the controller 36. Furthermore, if the pre-programmed list of unique addresses and associated operating programs is properly implemented, there is no need to manually identify and select which component has been connected, manually find the necessary operating program, or input specific characteristics of the connected component that are necessary for proper operation.

The data can be pre-programmed in various methods. In some aspects, the data containing all necessary commands and component characteristics can be used to construct a data map that is then utilized to by the PLC. In some aspects, existing tools can be used to make this selection, such as BBconn Cloud. Such selection can alternatively or additionally be done through the user interface on the dispensing device 10. The generated data map with unique address identifiers for PLC communication is an improvement over existing indexing protocols because this disclosed process eliminates the need to read and write each element of the connected component (e.g. the melt module 12) individually, reducing bus traffic and programming effort.

Figure 5:
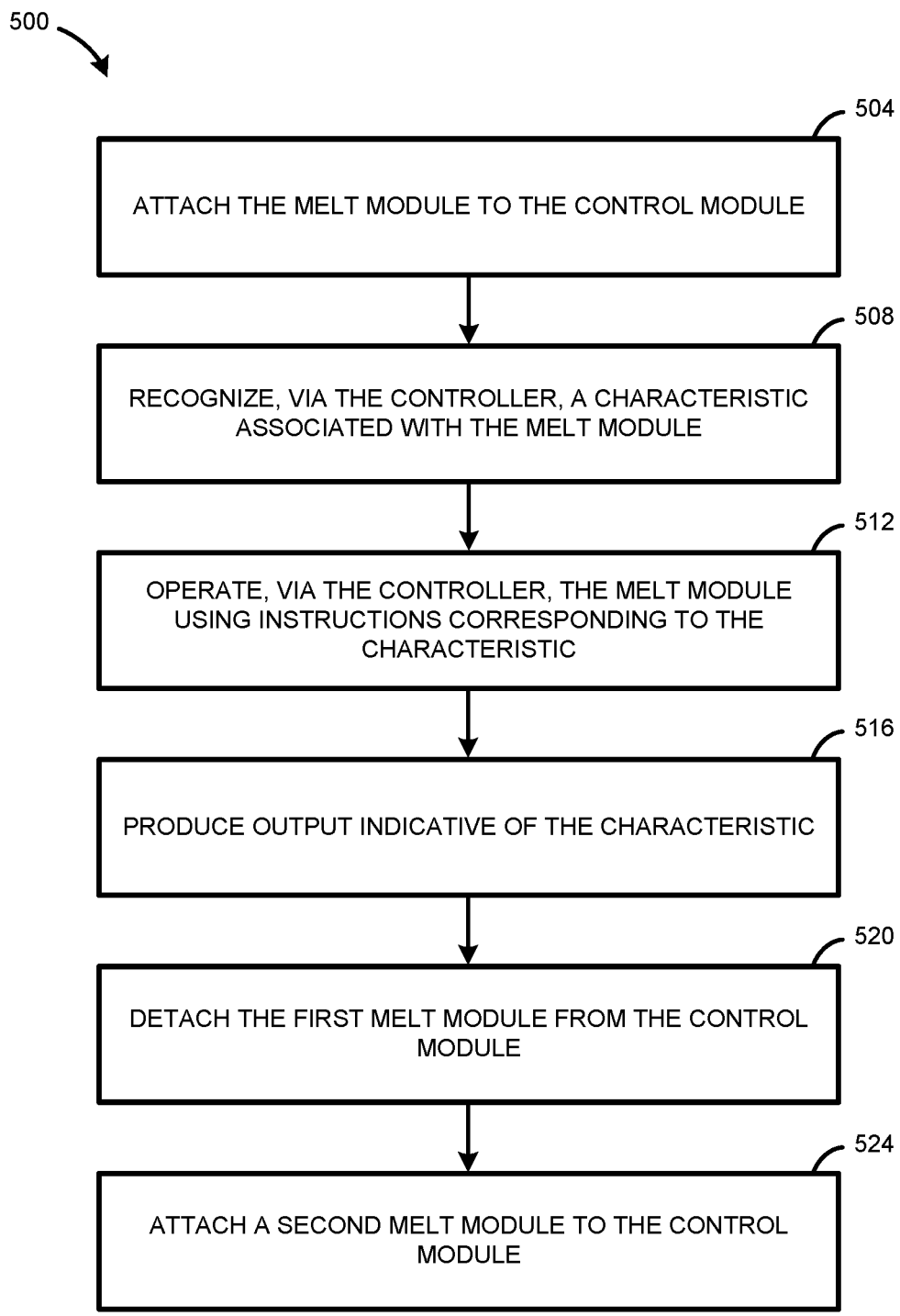
FIG. 5 illustrates a process flow diagram of a method of operating an adhesive dispensing device according to an embodiment of the present disclosure.

Now referring to FIG. 5, a method 500 of operating an adhesive dispensing device 10 according to an aspect of the present disclosure will be described. Step 504 of method 500 includes attaching the melt module 12 to the control module 14. Then, in step 508, the controller 36 recognizes a characteristic associated with the melt module 12. As previously stated, the characteristic can comprise a volume of the receiving space 94 of the melt module 12, a fill type (e.g. automatic or manual) of the melt module 12, or another characteristic. Then, in step 512, the controller 36 operates the melt module using instructions stored on the controller 36 that correspond to the characteristic of the melt module 12.

In step 516, an output representative of the characteristic can be displayed. The output can be produced by the HMI device 34 or, alternatively, by the remote device 38. As described above, the remote device can comprise a remote display and/or an external computing device, such as a cellular device, tablet, or laptop. In step 520, the first melt module 12 can be detached from the control module 14. Then, step 524 can include attaching a second melt module 12 to the control module 14. When connected, lower ends of the control module 14 and the first melt module 12 can define a first footprint that is substantially identical to a second footprint defined by the lower ends of the control modules 14 and the second melt modules 12. The first and second melt modules 12 an differ in that they have different receiving space volumes, different fill types (e.g. manual or automatic), or other characteristics.

Figure 6:
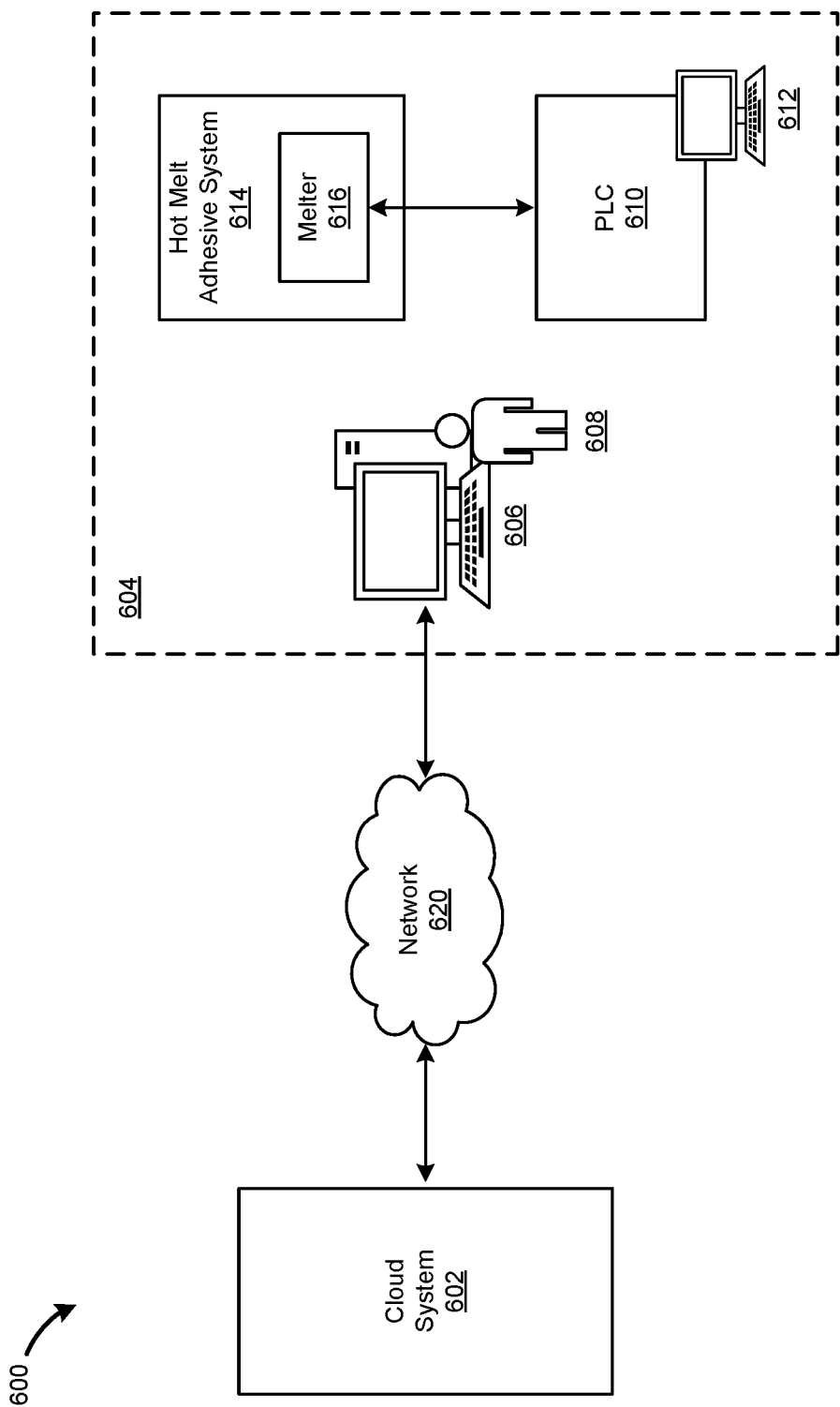
FIG. 6 illustrates a box diagram of a system.

FIG. 6 illustrates a block diagram of an example system 600 in which disclosed methods and techniques may be implemented. The system 600 may comprise a cloud system 602 in mutual communication with a client device 606, operable by a user 608 (e.g., a PLC or control engineer). The system 600 may further include a hot melt adhesive system 614 comprising a melter 616 (e.g., the melter 10 of FIGS. 1A-3), as well as other associated components. The melter 616 here may act as a controller for the hot melt adhesive system 614. A PLC 610 may be in mutual communication with the melter 616, or other control system of the hot melt adhesive system 614, and effect operations of the hot melt adhesive system 614, as well as provide or enable operator feedback and control as to the various parameters (set and/or measured) of the hot melt adhesive system 614. The hot melt adhesive system 614, the PLC 610, and/or the client device 606 may be located at a premises 604, such as a manufacturing facility.

The cloud system 602 may comprise one or more networked computing devices, such as servers. Such computing devices may comprise one or more web servers. The user 608 may operate the client device 606 to interact with the cloud system 602 and define a custom data map for use by the hot melt adhesive system 614 (e.g., the melter 616) and/or the PLC 610 to facilitate data exchanges therebetween. A custom data map may indicate particular parameter (e.g., a measured hose temperature or a heater setpoint) of the hot melt adhesive system 614 and corresponding memory spaces locations (e.g., cells) at the melter 616. The custom data map may be input to the melter 616, such as by the user 608, to configure the melter 616 for data exchanges with the PLC 610. The melter 616 may accordingly write and/or read these parameter values at the indicated memory space locations during the cyclic data exchanges with the PLC 610. Similarly, the PLC 610 may be programmed, such as by the user 608, to reference the specified memory space locations at the melter 616 to read and/or write the parameter values in the PLC's 610 cyclic data exchanges with the melter 616.

The user 608 may define a custom data map by means of a user interface (e.g., a web page user interface) provided by the cloud system 602. Via the user interface, the user 608 may select one or more parameters of the hot melt adhesive system 614 from a larger or "master" list of available parameters, and associate a selected parameter with a specified memory location in the melter's 616 memory space. By allowing a selection of a custom subset of all the available parameters, network congestion or bandwidth requirements between the melter 616 and the PLC 610 may be reduced. In addition, programming the PLC 610 may be simplified since there are less parameters to account for.

The user 608 having defined the custom data map for communications between the melter 616 and the PLC 610, the cloud system 602 may generate a configuration file (e.g., an Extensible Markup Language (XML) file) indicating the custom data map. The user 608 may download the configuration file to the client device 606, or otherwise access or save the configuration file. The configuration file (e.g., the custom data map) may be provided or input to the melter 616 to configure the melter 616 accordingly. For example, the user 608 may save the configuration file to a storage medium (e.g., a USB drive or other portable storage medium) and establish communication between the storage medium and the melter 616 to transfer the configuration file (e.g., the custom data map) to the melter 616. In some instances, this may entail the user 608 saving the configuration file to the aforementioned USB drive, moving to the melter 616, and inserting the USB drive into a port on the melter 616 to transfer the configuration file to the melter 616.

Having received the configuration file comprising the custom data map, the melter 616 may automatically configure itself to communicate with the PLC 610 according to the custom data map. Or further user input may be required by the user 608. Additionally or alternatively, the configuration file may be transferred to the melter 616 via other forms of digital communication, such as a wired or wireless network connection between the client device 606 and the melter 616 or between the cloud system 602 and the melter 616. For example, the cloud system 602 may be configured to directly transfer the configuration file comprising the custom data map to the melter 616. In these cases, the melter 616 may be configured with a network interface.

The PLC 610 may be generally configured to control operations of the hot melt adhesive system 614 and its constituent components, including the melter 616. The PLC 610 may comprise a computing device that is ruggedized or otherwise configured for use at the premises 604, such as a manufacturing facility, factory, or plant. In operation, the PLC 610 may set (i.e., write) values of the various parameters of the hot melt adhesive system 614, such as a pump motor speed setpoint, a melter control mode, service intervals, a PID controller parameter, an upper or lower fault alarm limit, a pressure setpoint, a minimum or maximum pressure limit, a value for overpressure warning, a melter tank temperature setpoint, a hose temperature setpoint, a melter standby time, a target fill level for a melter tank, fill level alert threshold, or a system ready delay time. The PLC 610 may also receive or read the values of various parameters of the hot melt adhesive system 614. These parameters may include measured or otherwise non-writable parameter values (e.g., statuses), such as a general system status, operating hours, a current fault code, a motor status, an actual pump motor speed, an actual pump output, an adhesive flow status, an actual adhesive flow speed, a pressure status, an actual melter tank temperature, a heater duty cycle, a controller auto-tune status, or an adhesive fill status. Some parameter may be both readable and writable by the PLC 610. For example, a motor mode parameter may be set by the PLC 610 but may also be read by the PLC 610 so the PLC 610 may determine the current motor mode parameter value.

The PLC 610 may be configured with or otherwise be connected to a programming device 612. The programming device 612 may comprise a terminal with a display and keyboard, for example. Additionally or alternatively, the programming device 612 may comprise a general computing device, such as a desktop computer or laptop. The programming device 612 may be co-located with the PLC 610 at the premises 604 (as shown in FIG. 6) or the programming device 612 may be remote from the premises 604 and access the PLC 610 via the network 620. The programming device 612 may be used by the user 608 (e.g., a PLC or control engineer) to program the PLC 610. For example, the user 608 may program the PLC 610 with a particular logic to control the operations of the hot melt adhesive system 614. The PLC 610 programming may be based on the custom data map defined by the user 608 via the cloud system 602. For example, the user 608 may reference the custom data map when programming a function of the PLC 610 that reads and/or writes a particular parameter of the hot melt adhesive system 614. Specifically, the user 608 may program the PLC 610 with the memory space location indicated in the custom data map. In this manner, when the PLC 610 is to read and/or write the value of this particular parameter, it is programmed to access the correct memory space location at the melter 616.

The PLC 610 may also be programmed by the user 608 to provide an operator user interface configured to display various parameters of the hot melt adhesive system 614, receive input to set various parameters of the hot melt adhesive system 614, or initiate various functions of the hot melt adhesive system 614. This operator user interface may be designed for use by an operator of the hot melt adhesive system 614 (as opposed to a PLC or control engineer). The custom data map may have been specifically defined so as to correspond to the various parameters referenced in the operator user interface (or contemplated for future designs or functions of the user interface). That is, the custom data map may indicate those parameters that are relevant to the operator user interface and its underlying functions while omitting those parameters that are not relevant. For example, if the operator user interface or its underlying functions do not display, set, or otherwise reference the hose temperature setpoint, this parameter may be omitted from the custom data map defined by the user 608.

The operator user interface may be output on a display (e.g. the HMI device 34 of the melter 10 shown in FIGS. 1A,C) of the melter 616 or other component of the hot melt adhesive system 614, for example. Additionally or alternatively, a separate computing device (not shown) associated with the hot melt adhesive system 614 may be used for operator interaction with the operator user interface provided by the PLC 610.

In addition to the melter 616, the hot melt adhesive system 614 may comprise one or more applicators or dispensers configured to receive hot melt adhesive from the melter 616. The hot melt adhesive system 614 may also comprise one or more heated hoses that convey the hot melt adhesive from the melter 616 to the applicators or dispensers of the hot melt adhesive system 614. Reference to a "hot melt adhesive system" may refer to a singular component of the hot melt adhesive system 614, a combination of components of the hot melt adhesive system 614, or the hot melt adhesive system 614 generally as a whole, unless clearly indicated otherwise. As depicted in FIG. 6, the melter 616 may perform control functions for the hot melt adhesive system 614. For example, the melter 616 may have an integrated controller (e.g., the controller 36 of the melter 10 in FIGS. 2-3). The disclosure is not so-limited, however, and the hot melt adhesive system 614 may comprise a separate controller, or a controller may be integrated with another component of the hot melt adhesive system 614. For example, the hot melt adhesive system 614 may comprise a ruggedized computing device that performs control functions and communicates with the PLC 610.

The client device 606 used by the user 608 to access the cloud system 602 and define a custom data map may comprise, for example, a desktop computer or a laptop. Although the client device 606 is show in FIG. 6 as located at the premises, the disclosure is not so limited and the client device 606 may be located off-site from the premises 604.

The network 620 may comprise, in any combination, a public network, a private network, a wireless network, or a wired network. An example public network may comprise the Internet or a wide area network (WAN). An example private network may comprise an intranet or a local area network (LAN). An example wireless network may comprise a cellular network or a wireless local area network (WLAN). An example wired network may comprise an Ethernet network.

Figure 7:
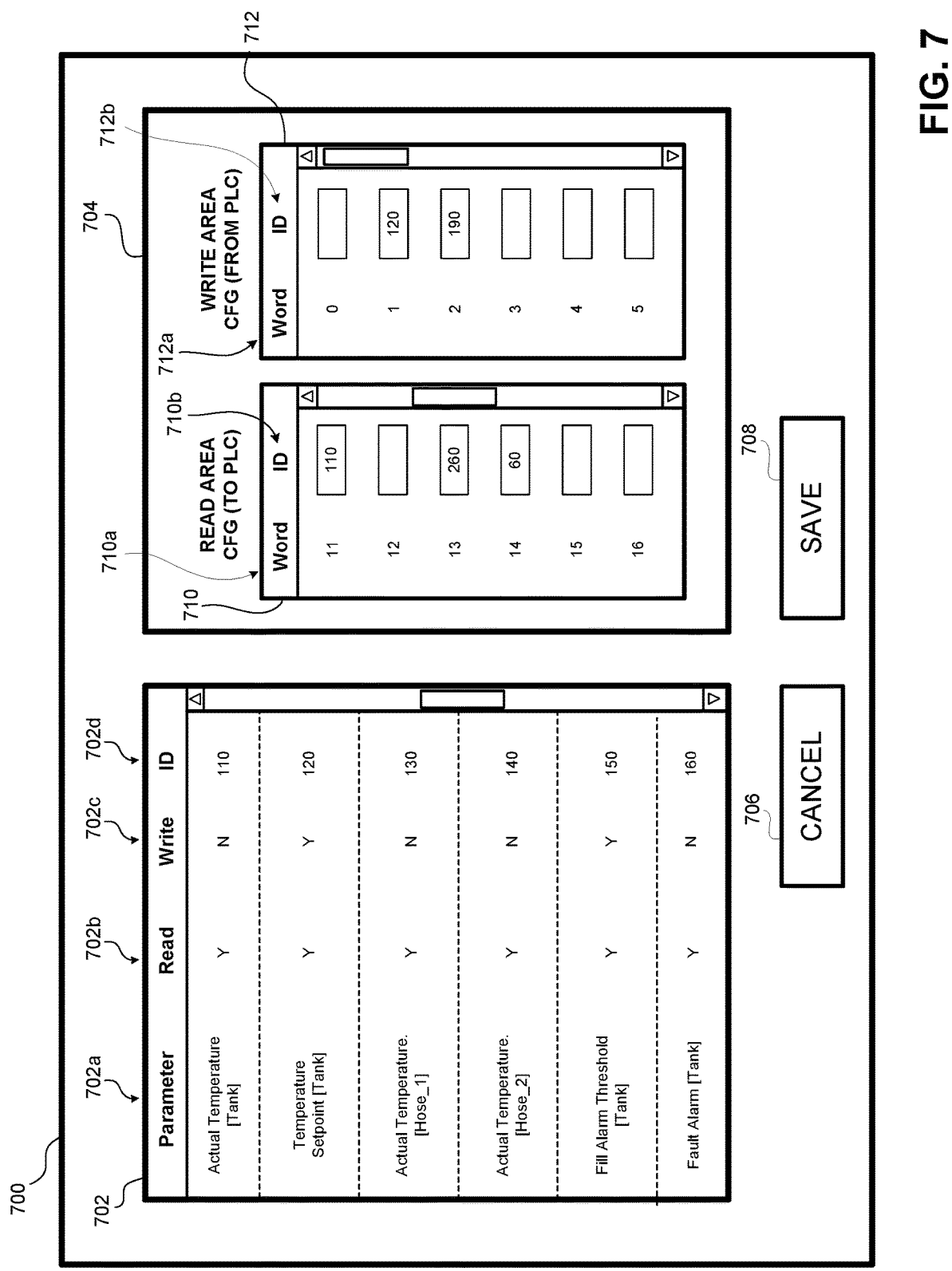
FIG. 7 illustrates a graphical user interface.

FIG. 7 illustrates an example user interface 700 (i.e., a graphical user interface) in which the user 608 may define a custom data map by selecting a desired subset of parameters from a master list of all possible parameters associated with the hot melt adhesive system 614 (e.g., the melter 616), which may be quite extensive. For each selected parameter, the user may specify the memory space location (e.g., "word") that will be associated with that parameter. The user interface 700 may be provided by the cloud system 602, such as via a web page provided by the cloud system 602. The user 608 may interact with the user interface 700 via the client device 606.

The user interface 700 comprises a parameter selection element 702 with a parameter column 702a, a read column 702b, and write column 702c, and an ID column 702d. Each row represents a specific parameter of the hot melt adhesive system 614. The parameters listed in the parameter selection element 702 may comprise the aforementioned master list of parameters. The parameter column 702a indicates a name for the hot melt adhesive system 614 parameter. The read column 702b indicates whether that parameter is readable by the PLC 610, or more particularly, whether that parameter may be stored in readable memory space of the melter 616. The write column 702c indicates whether that parameter is writable by the PLC 610, or more particularly, whether that parameter may be written by the PLC 610 in writable memory space of the melter 616. The ID column 702d indicates a unique identifier for the parameter. As an example, the first row in the parameter selection element 702 indicates an "Actual Temperature [Tank]" parameter (i.e., a measured temperature of the tank of the melter 616). This parameter is readable but not writable, and has an ID of 110. The next row indicates a "Temperature Setpoint [Tank]" parameter, which is both readable and writeable, and has an ID of 120.

The user interface 700 further comprises a memory location element 704 having a read area element 710 and a write area element 712. The read area element 710 generally identifies the memory space locations ("words") of the readable memory space of the melter 616 and enables the user 608 to assign a parameter from the parameter selection element 702 to a selected memory space location. In particular, the read area element 710 has a Word column 710a and an ID column 710b. Each row in the Word column 710a indicates the corresponding readable memory space location (e.g., 11, 12, 13, etc.). Each row in the ID column 710b provides a field in which the user 608 may indicate the identifier (from the ID column 702d) of the parameter that the user 608 wishes to assign that that memory space location. The user may drag and drop a parameter from the parameter selection element 702 to an available field in the ID column 710b. For example, the user 608 has indicated that the "Actual Temperature [Tank]" parameter (with an identifier of 110) is to be assigned the "11" memory space location, which will be reflected in a resultant custom data map. The user 608 may have identified this parameter because he or she wishes for the operator interface provided by the PLC 610 to display the current measured tank temperature. It is noted that the "Actual Temperature [Tank]" parameter is not writable by the PLC 610, as indicated by the "N" in the Write column 702c, and thus may not be dragged and dropped to (or otherwise selected) a memory space location field in the write area element 712.

Similarly, the write area element 712 generally identifies the memory space locations ("words") of the writable memory space of the melter 616 and enables the user 608 to assign a parameter from the parameter selection element 702 to a selected memory space location. Specifically, the write area element 712 includes a Word column 710a and an ID column 712b. Like with the read area element 710, each row in the Word column 712a indicates the corresponding writable memory space location (e.g., 0, 1, 3, etc.). Each row in the ID column 712b provides a field in which the user 608 may identify a parameter (i.e., parameter identifier) from the parameter selection element 702 that the user 608 wishes to assign to that memory space location. Again, the user may drag and drop a selected parameter from the parameter selection element 702 to the field in the ID column 712b that corresponds to the desired writable memory space location. For example, the user 608 has indicated that the "Temperature Setpoint [Tank]" parameter (with an identifier of 120) is to be assigned the "1" memory space location, which will also be reflected in the resultant custom data map. The user 608 may have identified this parameter because he or she wishes for the operator interface provided by the PLC 610 to allow an operator to input the temperature setpoint for the melter 616 tank.

The user interface 700 further comprises a Cancel element 706 and a Save element 708. The Cancel element 706 may be activated to cancel or undo any memory space location assignments. Conversely, the Save element 708 may be activated to save the memory space location assignments current indicated in the memory location element 704. For example, activation of the Save element 708 may cause the cloud system 602 to generate a configuration file that comprises the custom data map specified in the memory location element 704. As described, the client device 606 may download the configuration file and transfer it to the melter 616, which will be configured accordingly. The PLC 610 may also be programmed to communicate with the melter 616 based on the custom data map. Provided below is an example custom data map in XML format.

```
<?xml version="1.0"?>
  <FileCRC>00f3463c24</FileCRC>
<Mapping>
  <DBVersion Value="786" />
  <inADIs>
    <ADI id="10" pos="0" />
    <ADI id="100" pos="4" />
    <ADI id="10000" pos="8" />
    <ADI id="13000" pos="12" />
    <ADI id="10550" pos="16" />
    <ADI id="10551" pos="17" />
    <ADI id="10552" pos="18" />
  </inADIs>
```

-continued

```
  <outADIs>
    <ADI id="12" pos="0" />
    <ADI id="101" pos="4"/>
    <ADI id="10001" pos="8" />
    <ADI id="13001 " pos="12" />
    <ADI id="10547" pos="16" />
  </outADIs>
</Mapping>
```

In the above XML custom data map, the "ADI id" field indicates the identifier of the parameter and the "pos" field indicates assigned the memory space location for that parameter. Specifically, the "pos" filed indicates the offset number (e.g., cell position) in the memory space. The entries between the "<inADIs>" and "</inADIs>" tags correspond to the readable memory space and the entries between the "<outADIs>" and </outADIs>" tags correspond to the writable memory space. "ADI" may refer to application data identifier.

Figure 8:
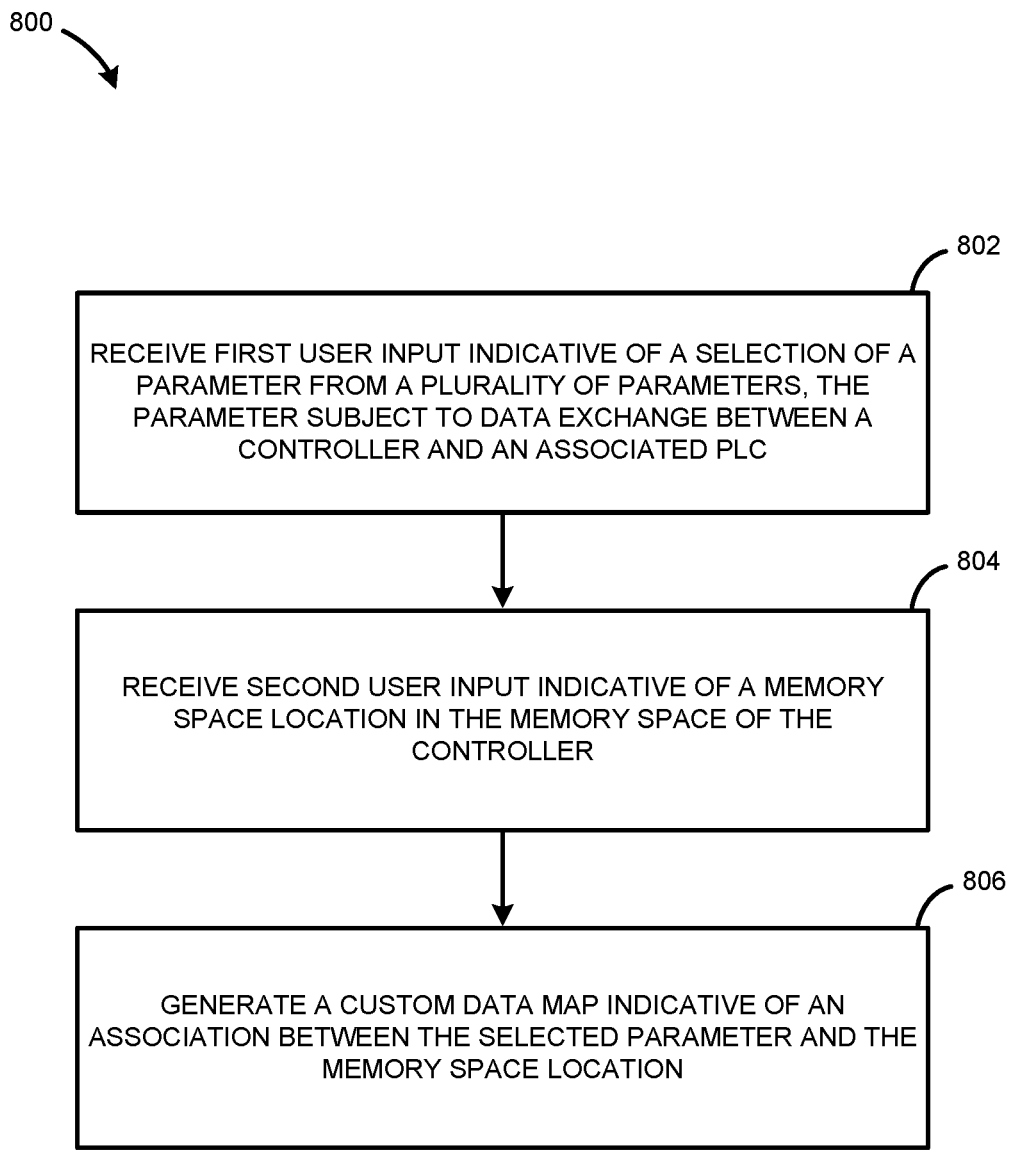
FIG. 8 illustrates a method flow diagram.

FIG. 8 illustrates a method flow diagram of an example method 800 for determining a custom data map to facilitate communication between a controller of an adhesive dispensing system (e.g., the hot melt adhesive system 614 of FIG. 6) and an associated PLC (e.g., the PLC 610). The method 800 may be performed, at least in part, by the cloud system 602 of FIG. 6.

At step 802, a first user input may be received, such as by a cloud computing system, that is indicative of a selection of a parameter from a plurality of parameters associated with the adhesive dispensing system. The parameter may be subject to data exchange between a controller of the adhesive dispensing system and a PLC associated with the adhesive dispensing system. For example, the parameter may comprise a measured actual tank temperature, which may be stored and subsequently read by the controller on a cyclical basis. The controller may comprise a melter (e.g., the melter 616 of FIG. 6) of the adhesive dispensing system. The plurality of parameters may comprise a master list of all available parameters for the particular model and/or make of the controller (e.g., melter). For example, the model number and/or the serial number of the controller may be input by a user to determine the plurality of parameters from which to select.

At step 804, a second input may be received, such as by the cloud computing system, that is indicative of a memory space location in the memory space of the controller. The memory space location may be in an input/writable memory space or in an output/readable memory space. The memory space location may comprise a cell, an offset position, or a word in the memory space.

At step 806, a custom data map may be generated, such as by the cloud computing system, that is indicative of an association between the selected parameter and the memory space location. Such an association may indicate that parameter values of the parameter are to be indicated (e.g., stored and/or read) in that memory space location. The custom data map may be generated in the form of a configuration file, such as an XML file. That is, such configuration file may indicate the custom data map. The configuration file may be sent to (e.g., downloaded by) a requesting client device (e.g., the client device 606). The first and second user inputs may be been received from the client device.

The first and second user inputs may be received by a graphical user interface provided by the cloud computing system, such as the user interface 700 of FIG. 7. The graphical user interface may comprise a listing of the plurality of parameters (e.g., the master list of parameters) and a listing of available memory space locations. A user may enter an initial input of the model number and/or serial number of the controller. The listing of the plurality of parameter values may be based on the model number and/or serial number. As explained with respect to FIG. 7, the user may drag-and-drop the list element for the selected parameter to the desired list element for the memory space location.

As noted, the configuration file comprising the custom data map may be downloaded to a client device. For example, a PLC engineer may enter the first and second user inputs to define the desired custom data map. The desired parameters indicated by the engineer may reflect those parameters that the engineer wishes to make available for display and/or editing by adhesive dispenser system operators, for example. The engineer may subsequently download the configuration file and input this configuration file and/or its custom data map to the controller. The controller may thereby configure itself to communicate with the PLC according to the custom data map. The engineer may also program the PLC using the custom data map. For instance, the engineer may program the PLC to read and/or write the desired parameter values at the corresponding memory space locations of the controller indicated in the custom data map.

Figure 9:
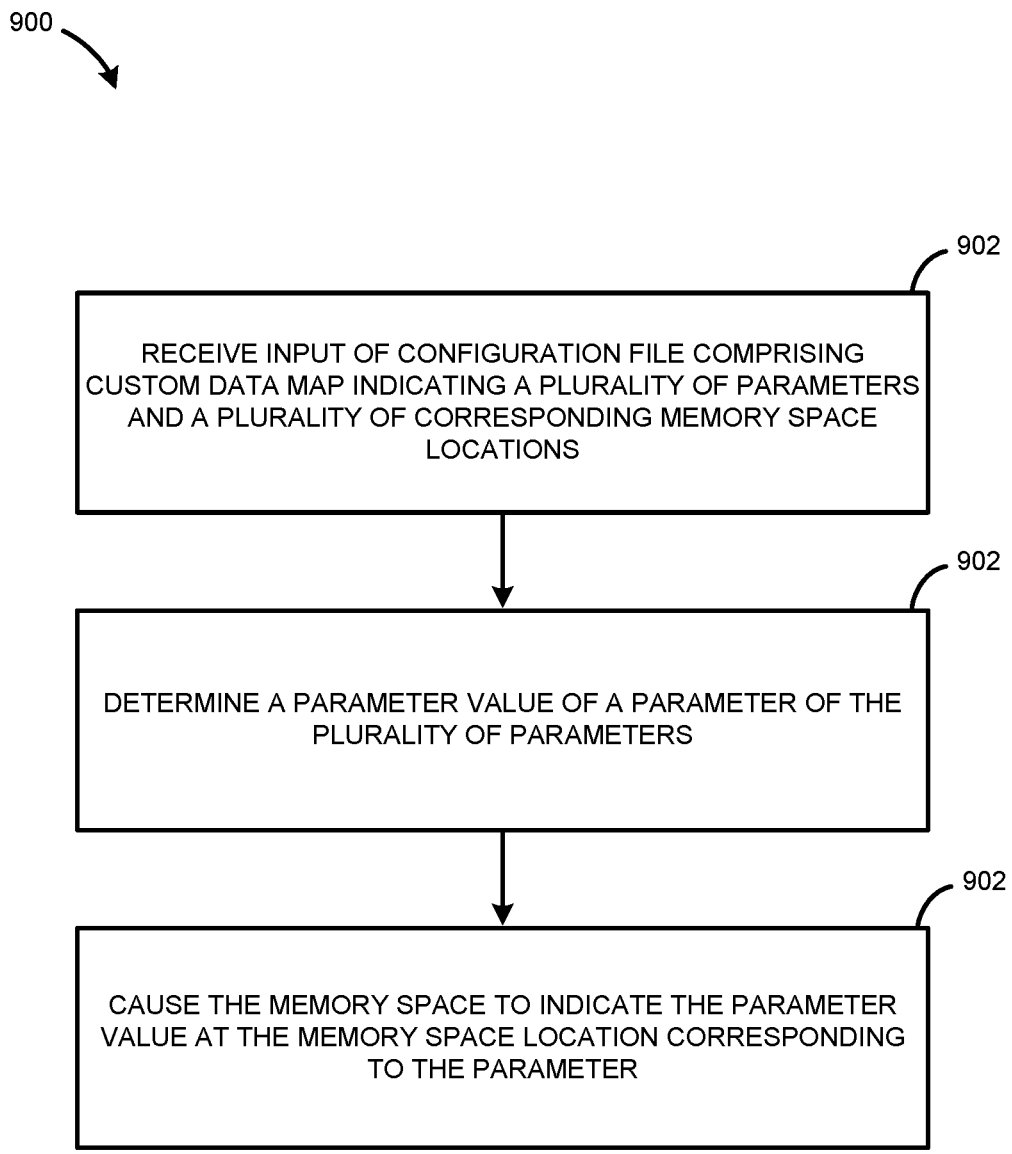
FIG. 9 illustrates a method flow diagram.

FIG. 9 illustrates and example method 900 for configuring a controller of an adhesive dispensing system (e.g., the hot melt adhesive system 614 of FIG. 6). The controller may comprise the melter of the adhesive dispensing system. The controller may perform the method 900. That is, the controller may comprise one or more processors and memory storing instructions that, when executed by the one or more processors, cause the controller to perform the method 900. The controller may be configured to perform the method 900 without user input or intervention, aside from a user initially inputting a configuration file to the controller, such as via a USB drive.

At step 902, the controller may receive an input of a configuration file comprising a custom data map. For example, the above-noted PLC engineer may input the configuration file to the controller. The custom data map may indicate a plurality of parameter associated with the adhesive dispensing system and a plurality of corresponding memory space locations of a memory space available to the controller (e.g., the controller's memory space). For example, the custom data map may indicate a particular parameter and the memory space location at which the parameter values of this parameter are to be read and/or written. The configuration file may have been previously generated according to the method 800. The plurality of parameters may be a sub-set of the master list of parameters available for the particular controller.

At step 904, the controller may determine a parameter value of a parameter of the plurality parameter values. The parameter value may be determined during the normal course of operations of the adhesive dispensing system, such as after the controller is configured with the custom data map. For example, the controller may determine that a fill level of the melter has gone below a fill threshold.

At step 906, the controller may cause the memory space to indicate the determined parameter value at the memory space location corresponding to the parameter (indicated in the custom data map). In the fill level example above, the fill level exceeding the fill threshold may be indicated at the corresponding memory space location indicated in the custom data map. Such memory space may be an output/readable memory space, since this parameter is not expected to be a parameter that may be set by the controller.

Figure 10:
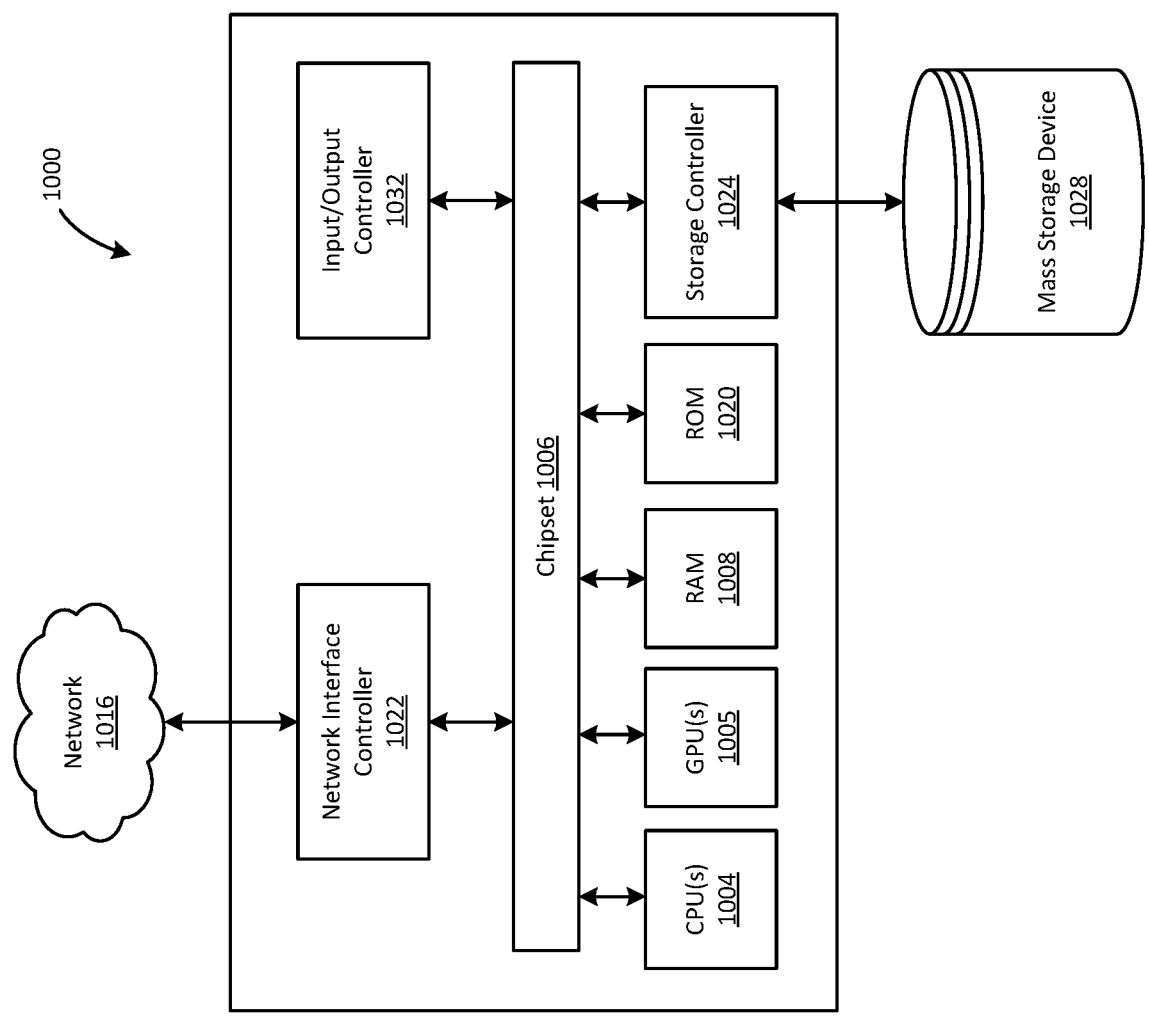
FIG. 10 illustrates a box diagram of a computing system.

FIG. 10 depicts an example computing device in which the systems, methods, and devices disclosed herein, or all or some aspects thereof, may be embodied. For example, components such as the remote device 38 of FIG. 1A, the controller 36 of FIGS. 2-3, and cloud system 602, the client device 606, the PLC 610, the programming device 612, and the melter 616 (or other controller) of FIG. 6 may be implemented, in whole or in part, in a computing device, such as the computing device 1000 of FIG. 10. The computing device of FIG. 10 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1001 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts, and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features, and concepts may be expressly identified herein as being inventive or forming part of an invention, such identification is not intended to be exclusive, but rather there may be inventive aspects, concepts, and features that are fully described herein without being expressly identified as such or as part of a specific invention, the scope of the inventions instead being set forth in the appended claims or the claims of related or continuing applications. Descriptions of exemplary methods or processes are not limited to inclusion of all steps as being required in all cases, nor is the order that the steps are presented to be construed as required or necessary unless expressly so stated.

While the invention is described herein using a limited number of embodiments, these specific embodiments are not intended to limit the scope of the invention as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in a particular order as desired.

What is claimed is:

1. A method, comprising:
   receiving a first user input indicative of a selected parameter from a plurality of parameters associated with a melter of a hot melt adhesive dispensing system including one or more applicators configured to dispense a hot melt liquid adhesive received from the melter, wherein the selected parameter is subject to data exchange between a controller of the melter and an associated programmable logic controller (PLC);
   receiving a second user input indicative of a memory space location in a memory space of the controller; and
   generating a custom data map indicative of an association between the selected parameter and the memory space location, wherein the custom data map facilitates communication between the controller of the melter and the associated PLC.

2. The method of claim 1, wherein generating the custom data map comprises generating a configuration file that indicates the custom data map.

3. The method of claim 1, further comprising providing the custom data map to the melter to cause the controller to effectuate communication with the associated PLC according to the custom data map such that the associated PLC is configured to control operation of the melter.

4. The method of claim 2, further comprising:
   sending the configuration file to a requesting client device.

5. The method of claim 1, wherein the plurality of parameters comprises a master list of parameters associated with the controller.

6. The method of claim 1, further comprising:
   configuring the associated PLC based on the custom data map to perform data exchanges associated with the selected parameter according to the memory space location indicated in the custom data map.

7. The method of claim 1, wherein at least one of receiving the first user input, receiving the second user input, and generating the custom data map is performed by a cloud computing system.

8. The method of claim 7, wherein the first user input and the second user input are each received via a graphical user interface associated with the cloud computing system, the graphical user interface comprising a listing of the plurality of parameters and a listing of available memory space locations.

9. The method of claim 8, further comprising:
   receiving a third user input indicative of at least one of a model number of the controller and a serial number of the controller, wherein the listing of the plurality of parameters is based on the at least one of the model number of the controller and the serial number of the controller.

10. A controller configured to operate a melter of a hot melt adhesive dispensing system including one or more applicators configured to dispense a hot melt liquid adhesive received from the melter, the controller comprising:
    one or more processors; and
    memory storing instructions that, when executed by the one or more processors, cause the controller to:
    receive input of a configuration file comprising a custom data map, wherein the custom data map indicates a plurality of parameters associated with the adhesive dispensing system melter and a plurality of corresponding memory space locations of a memory space available to the controller, and wherein the custom data map facilitates communication between the controller of the melter and an associated programmable logic controller (PLC);
    determine a parameter value of a parameter of the plurality of parameters; and
    cause the memory space to indicate the parameter value at a memory space location corresponding to the parameter.

11. The controller of claim 10, wherein input of the configuration file to the controller causes the controller to effectuate communication with the associated PLC according to the custom data map such that the associated PLC is configured to control operation of the melter.

12. The controller of claim 10, wherein the plurality of parameters indicated in the custom data map comprises a sub-set of available parameters of the melter.

13. The controller of claim 10, wherein the custom data map identifies each of the plurality of corresponding memory space locations as at least one of an input memory space location and an output memory space location.

14. The controller of claim 10, wherein the memory space is configured for access by the associated PLC.

15. The controller of claim 10, wherein the instructions, when executed by the one or more processors, further cause the controller to:
    determine the parameter value and cause the memory space to indicate the parameter value at the memory space location without user input.

16. A device, comprising:
    one or more processors; and
    memory storing instructions that, when executed by the one or more processors, cause the device to:
    receive a first user input indicative of a selected parameter from a plurality of parameters associated with a melter of a hot melt adhesive dispensing system including one or more applicators configured to dispense a hot melt liquid adhesive received from the melter, wherein the selected parameter is subject to data exchange between a controller of the melter and an associated programmable logic controller (PLC);

receive a second user input indicative of a memory space location in a memory space of the controller; and generate a custom data map indicative of an association between the selected parameter and the memory space location, wherein the custom data map facilitates communication between the controller of the melter and the associated PLC.

17. The device of claim 16, wherein the instructions, when executed by the one or more processors, further cause the device to:

generate a configuration file that indicates the custom data map; and send the configuration file to a requesting client device.

18. The device of claim 17, wherein the instructions, when executed by the one or more processors, further cause the device to provide the custom data map to the melter to cause the controller to effectuate communication with the associated PLC according to the custom data map such that the associated PLC is configured to control operation of the melter.

19. The method of claim 1, wherein the selected parameter is selected from the group consisting of a measured temperature of a hose of the hot melt adhesive dispensing system configured to convey the hot melt liquid adhesive from the melter to the one or more applicators and a temperature setpoint of a heater of the hot melt adhesive dispensing system.

20. The method of claim 1, wherein the associated PLC is configured to both set and read values of the plurality of parameters associated with the melter, such that the associated PLC is configured to determine a current value of each of the plurality of parameters associated with the melter.

* * * * *